US012573923B2

(12) United States Patent
 Quail et al.

(10) Patent No.: US 12,573,923 B2
(45) Date of Patent: Mar. 10, 2026

(54) SYSTEM AND METHOD FOR CONTROLLING CURRENT DISTRIBUTION TO ELECTRICAL BRUSHES USED IN DYNAMOELECTRIC MACHINE

(71) Applicant: GE Infrastructure Technology LLC, Greenville, SC (US)

(72) Inventors: Paul August Quail, Balston Lake, NY (US); Jason Salvatore Disanto, Dunwoody, GA (US); Eric Steven Buskirk, Scotia, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 120 days.

(21) Appl. No.: 18/493,929

(22) Filed: Oct. 25, 2023

(65) Prior Publication Data

US 2025/0141323 A1     May 1, 2025

(51) Int. Cl.
*H02K 13/14*        (2006.01)

(52) U.S. Cl.
CPC ................................... *H02K 13/14* (2013.01)

(58) Field of Classification Search
CPC ........ H02K 13/14; H02K 13/10; H02K 11/27; H02K 13/003; H02K 11/0094; H02K 11/04; H02K 19/36; H01R 39/54; H01R 39/64; H01R 2201/10; H02P 25/12; H02P 9/16; Y10S 388/928
See application file for complete search history.

(56) References Cited

U.S. PATENT DOCUMENTS 8,972,219 B2    3/2015   Schieke et al.
9,793,670 B2    10/2017   Steinbach et al.
10,658,806 B2    5/2020   Scalzo, III et al.

FOREIGN PATENT DOCUMENTS

JP        S62268337 A   *   11/1987

OTHER PUBLICATIONS

JP-S62268337-A_translate (Year: 1987).*
Author: Shobert, Erle I, Title: Book, Carbon Brushes the Physics and Chemistry of Sliding Contact, presented by Stackpole Carbon Company, Date: Unknown, pp. 164-167, Published: USA.

* cited by examiner

*Primary Examiner* — Tulsidas C Patel
*Assistant Examiner* — Mohammed Ahmed Qureshi
(74) *Attorney, Agent, or Firm* — Grogan, Tuccillo & Vanderleeden LLP

(57)        ABSTRACT

A system and method for controlling current distribution to electrical brushes used in a dynamoelectric machine is disclosed. The approach includes using an arrangement of resistor devices electrically connected to the electrical brushes to control a distribution of a flow of the electrical current between an external source and the electrical brushes. The arrangement of the resistor devices is configured to control an amount of the flow of the electrical current that is distributed to individual brushes and/or one or more groups of brushes while the dynamoelectric machine is operating.

19 Claims, 12 Drawing Sheets

SYSTEM AND METHOD FOR CONTROLLING CURRENT DISTRIBUTION TO ELECTRICAL BRUSHES USED IN DYNAMOELECTRIC MACHINE

CROSS REFERENCE TO RELATED APPLICATIONS

The present patent application is related to concurrently filed, co-pending, and commonly assigned U.S. patent application Ser. No. 18/493,906, entitled "SYSTEM AND METHOD FOR SELECTIVE ACTIVATION AND DEACTIVATION OF ELECTRICAL BRUSHES USED IN DYNAMOELECTRIC MACHINE FOR CURRENT DENSITY OPTIMIZATION", the disclosure of which is incorporated herein by reference.

BACKGROUND

Technical Field

Embodiments of this disclosure relate generally to dynamoelectric machines, and more specifically, to deploying an arrangement of resistor devices in electrical connection with electrical brushes that are maintained on a surface of a collector ring placed on a rotating shaft of a dynamoelectric machine for controlling current distribution to individual brushes or groups of brushes.

Discussion of Art

A dynamoelectric machine, such as for example, an electrical generator, includes a rotor body that can be made of a ferrous metal material that is rotatably mounted on a shaft via a bearing assembly. Arranged circumferentially about the mid-section of the rotor body are a multiple of axially oriented slots extending radially outward from a center of the rotor body that hold a multiple of field windings of coils that can be made of copper or aluminum. These field windings of coils can include longitudinally oriented central windings secured within the slots, and turns of endwindings extending out from the slots at axial ends of the rotor body. The shaft of the electrical generator can include a driven end having a coupling for a prime mover, such as for example a gas turbine or a steam turbine, that is operative to turn the shaft. The turning of the shaft by the prime mover produces a rotating magnetic field within the machine. This induces a three-phase set of voltages with stator windings in a stator of the electrical generator that encloses the rotor body. The opposing end of the shaft, which can be referred to as the non-driven end, includes collector rings mounted on or attached to the shaft that rotate with shaft as the shaft rotates. Stationary electrical brushes, that are typically spring loaded, are maintained continuously on a surface of the collector rings as the rings rotate with the shaft. Electrical current from an external source can be supplied to the collector rings via the electrical brushes. The electrical current passes from the collector rings internally through the shaft to the field windings of coils in the rotor body. In this manner, the electrical current that passes from the electrical brushes to the collector rings to the field windings of coils can maintain the rotating electromagnetic field at a fixed polarity.

In operation, the electrical brushes can be configured to act as a manifold to distribute the electrical current from the external source to the collector rings. The typical number of electrical brushes that can be utilized per collector ring in such a manifold configuration can range from, for example, between 10 and 100. Any small difference in resistance in each individual brush path or leg from the external source to the collector rings in comparison to the other legs will affect the division of the electrical current among all of the electrical brushes. In general, the resistance in each leg includes a multiple of resistance components that contribute to the overall resistance of the leg. FIG. 1 illustrates these resistance components that exist between an external source 48 that supplies electrical current to a collector ring 32 via a plurality of electrical brushes 40 per a conventional configuration. The main resistance in each leg is a sliding contact between the electrical brush 40 and the collector ring 32, of which this contact resistance is depicted in FIG. 1 as Rc. By its nature, the contact resistance Rc is a very variable resistance. The variability of the contact resistance Rc is made worse when electrical brushes operate at low or high current densities, which is becoming prevalent as power plants increase turndown capability to operate over a wider load range that necessitates operating over a large range of field currents that is typically outside of the range of the brushes' current density requirements.

Other resistance components in the electrical path of each leg from the external source 48 to the collector ring 32 that are variable by nature and that can affect the distribution of the electrical current include the resistance of the electrical brush 40 itself and other miscellaneous resistances that arise from electrical connections and unintended electrical paths that are developed in the path from the external source 48 to collector ring 32. The resistance of the electrical brush 40 is depicted in FIG. 1 as Rb, while the miscellaneous resistances are depicted as Rm. The resistance of the electrical brush Rb typically changes inversely to the temperature of the brush during operation and the length of the brush as it wears. The miscellaneous resistances Rm typically arise from electrical connections and unintended electrical paths that are developed from the need to mechanically support the electrical brush during operation of the electrical generator.

All of the resistance components that exist in the legs between the external source 48 and the collector ring 32 can significantly impact the distribution or split of the electrical current through the legs to a point that some of the electrical brushes will have almost zero current, while other brushes will receive two to three times the average current value that the brushes are optimized to handle. This uneven distribution of the electrical current between the electrical brushes, that is often referred to as selectivity, can lead to brushes overheating, having poor film development between the brushes and the collector rings (which is essential to maintaining brush life and minimizing variability of the contact resistance Rc). These conditions can eventually lead to a flashover that can result in significant arc damage and melted parts, creating a safety risk to nearby operators.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The solution provided by the various embodiments that obviates the aforementioned selectivity issues that arise from the inherent variability of the resistance in the individual brush paths or legs from the external source to the collector rings includes providing an arrangement of resistor devices between the source and the electrical brushes to remove the variable resistance between the source and the brushes. In this manner, the resistor devices can control an amount of the flow of the electrical current that is distributed to individual brushes and/or one or more groups of brushes from the external source by balancing out the variation in the resistance in each leg. This ensures that each electrical brush can receive a specified current flow. In one embodiment, the resistor devices can be utilized to control the flow of the electrical current from the external source such that each of the electrical brushes are driven to share an equal amount of the electrical current. The resistor devices that can be deployed in any of the various embodiments, in either a passive application or an active application, can be selected from the group consisting of fixed resistors, variable resistors, power electronic-based resistors, and combinations thereof.

In addition to using the arrangement of resistors, embodiments can include deploying switches to selectively activate and deactivate the electrical brushes to control the current density of the flow of the electrical current that is provided to the electrical brushes. For example, selective ones of the switches can be opened and closed for a predetermined time period to adjust the average current density of the electrical current that passes through the electrical brushes to be within a predetermined current density range. In these embodiments in which switches are deployed to adjust the average current density provided to the electrical brushes, the resistor devices can then be used to control the amount of the electrical current that is received at each of the electrical brushes to a specified electrical current amount.

In accordance with one embodiment, a system is provided. The system comprises: a collector ring placed on a rotating shaft of a dynamoelectric machine; a plurality of electrical brushes maintained on a surface of the collector ring as the collector ring rotates with the rotating shaft, wherein the plurality of electrical brushes are configured to pass electrical current between an external source and the dynamoelectric machine via the collector ring; and an arrangement of a plurality of resistor devices electrically connected to the plurality of electrical brushes to control a distribution of a flow of the electrical current between the external source and the plurality of electrical brushes, wherein the arrangement of the plurality of resistor devices is configured to control an amount of the flow of the electrical current that is distributed to individual brushes and/or one or more groups of electrical brushes while the dynamoelectric machine is operating.

In accordance with another embodiment, a dynamoelectric machine is provided. The dynamoelectric machine comprises: a rotatable shaft; a rotor body mounted on the rotatable shaft, the rotor body having a plurality of field windings of coils secured thereabout; at least one collector ring placed on an end of the rotatable shaft; a plurality of electrical brushes maintained on a surface of the at least one collector ring as the at least one collector ring rotates with the rotatable shaft, wherein the plurality of electrical brushes are configured to pass electrical current between an external source and the field windings of coils secured to the rotor body via the at least one collector ring; and an arrangement of a plurality of resistor devices electrically connected to the plurality of electrical brushes to control a distribution of a flow of the electrical current between the external source and the plurality of electrical brushes, wherein the arrangement of the plurality of resistor devices is configured to control an amount of the flow of the electrical current that is distributed to individual brushes and/or one or more groups of brushes from the plurality of electrical brushes while the dynamoelectric machine is operating.

In accordance with yet another embodiment, a method for controlling current distribution to a plurality of electrical brushes maintained on a surface of a collector ring placed on a rotating shaft of a dynamoelectric machine that pass current between an external source and the dynamoelectric machine is provided. The method comprises: arranging a plurality of resistor devices in electrical connection with the plurality of electrical brushes and the external source; and controlling a distribution of a flow of the electrical current between the external source and the plurality of electrical brushes with the plurality of resistor devices, wherein the plurality of resistor devices are configured to control a specified amount of the flow of the electrical current that is distributed to individual brushes and/or one or more groups of brushes from the plurality of electrical brushes while the dynamoelectric machine is operating.

DRAWINGS

The present invention will be better understood from reading the following description of non-limiting embodiments, with reference to the attached drawings, wherein below:

Figure 2:
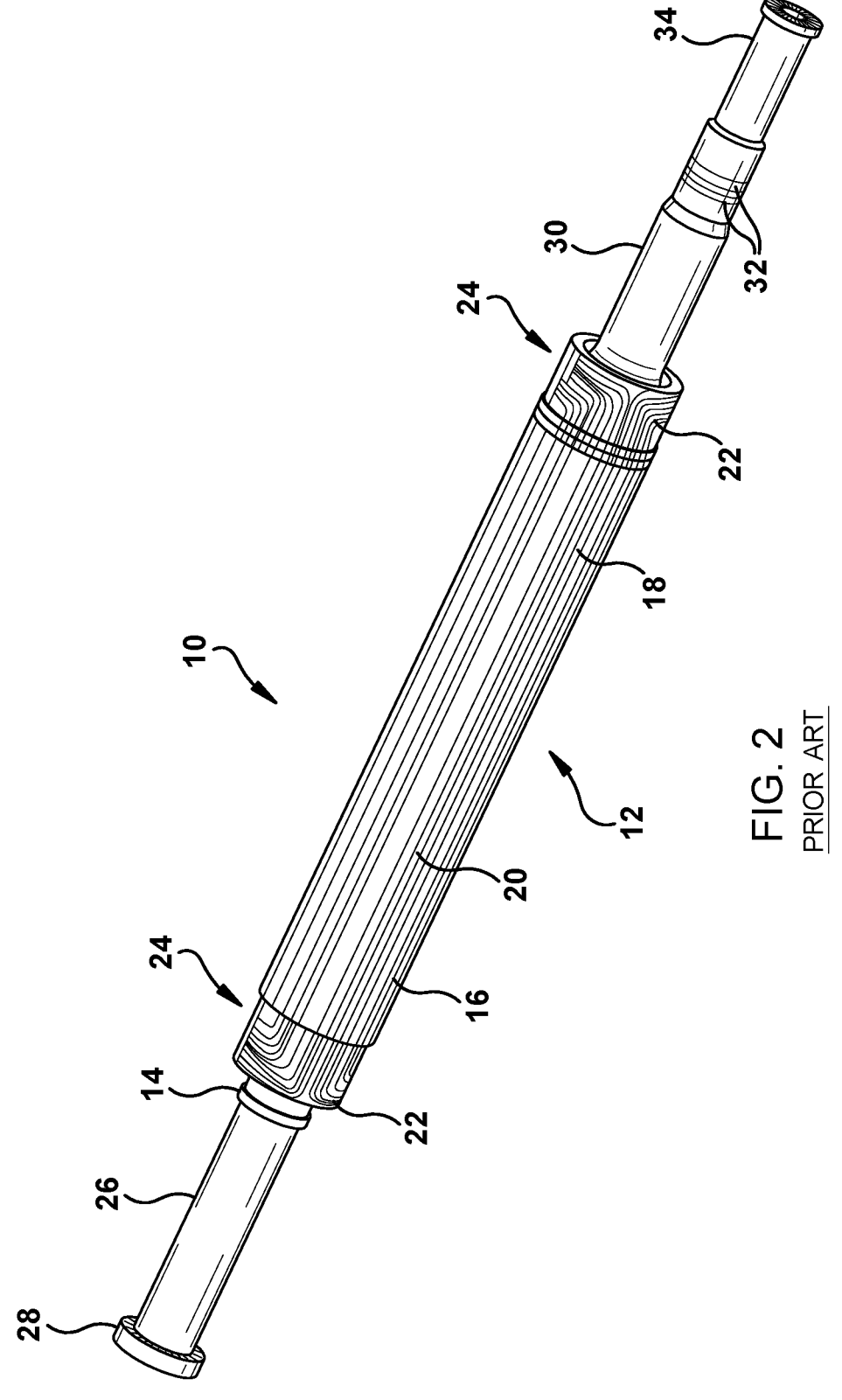
FIG. 2 shows an isometric view of a dynamoelectric machine such as an electrical generator according to the prior art.
Figure 3:
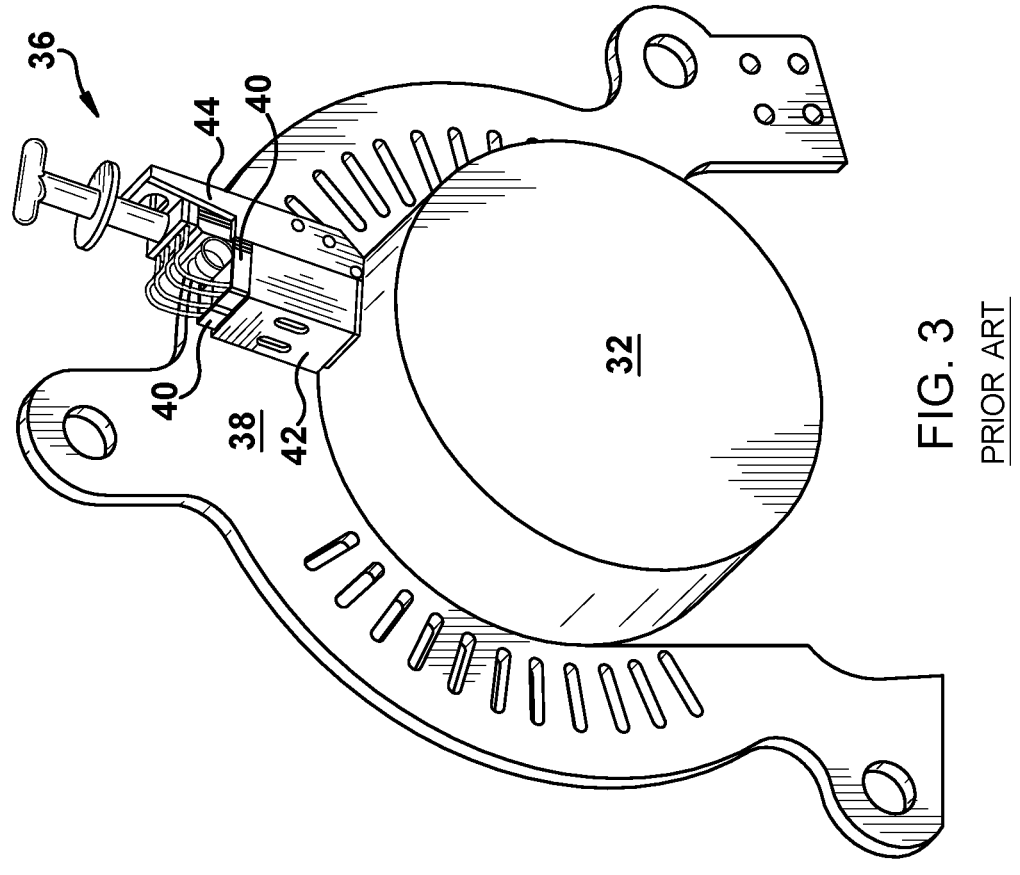
FIG. 3 illustrates a partial perspective view of a single brush holder rigging assembly installed on a brush mount or a collector horseshoe installed on a collector ring of an electrical generator like that depicted in FIG. 2 according to the prior art.
Figure 4:
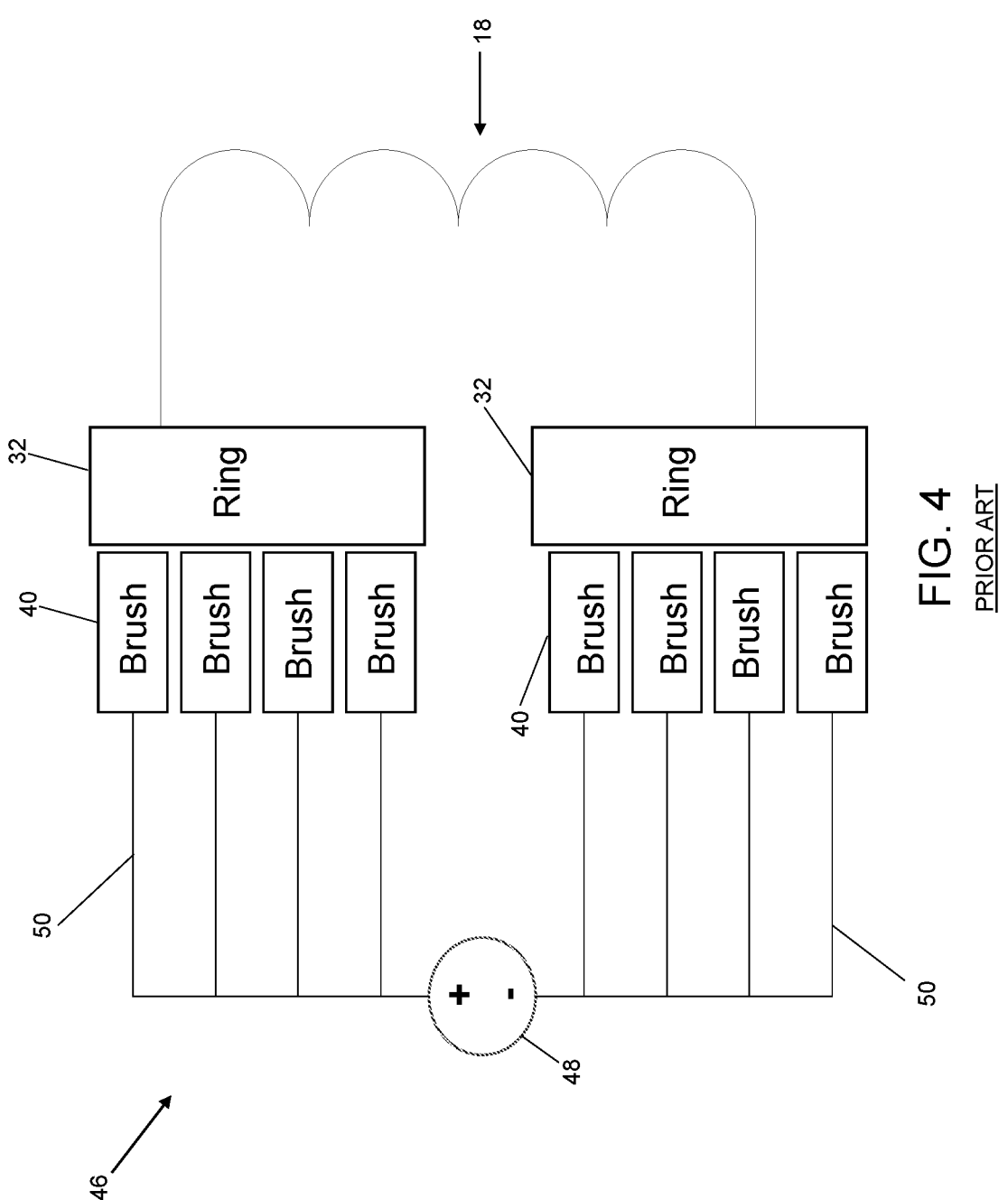
Figure 5:
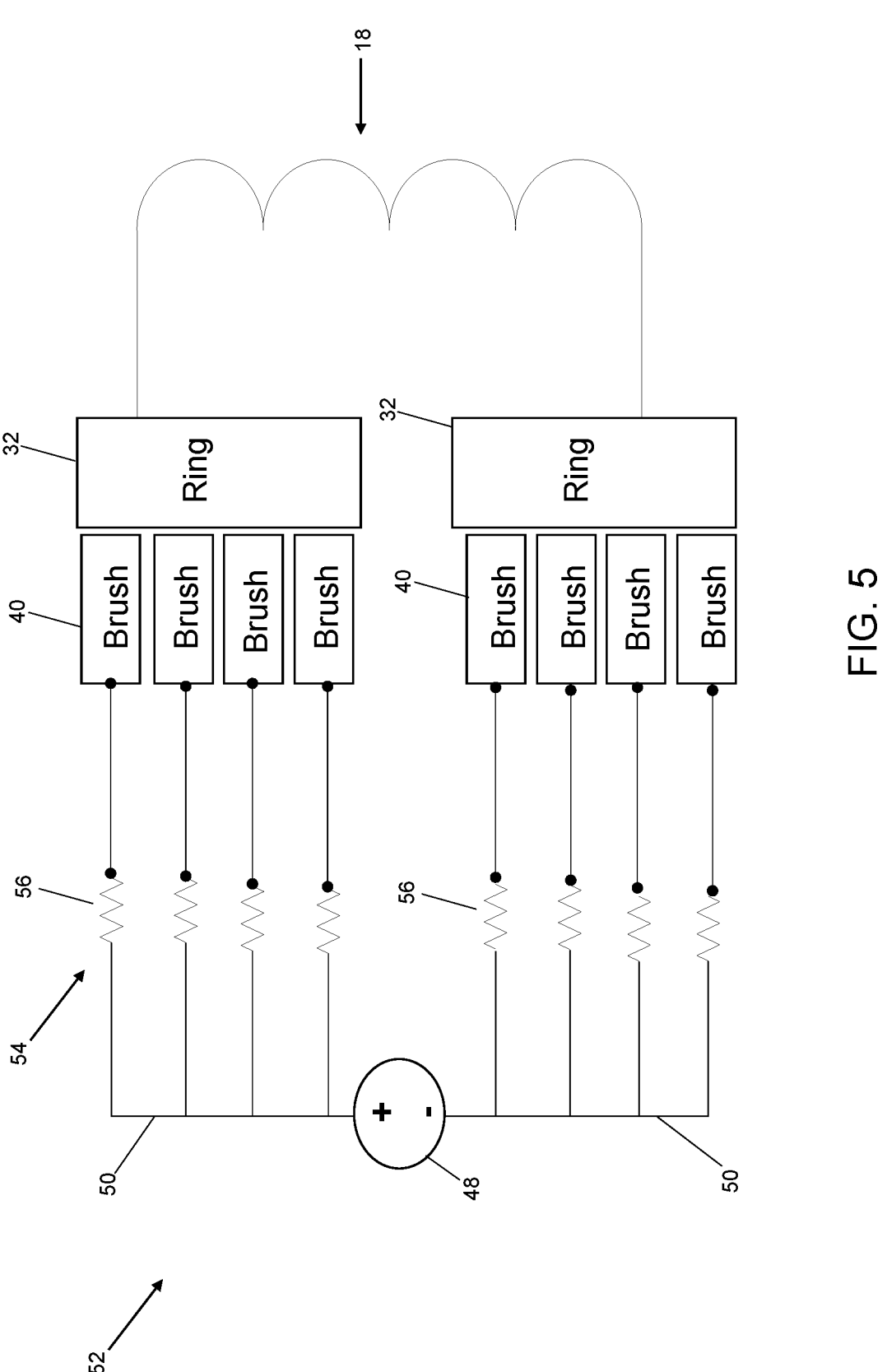
Figure 6:
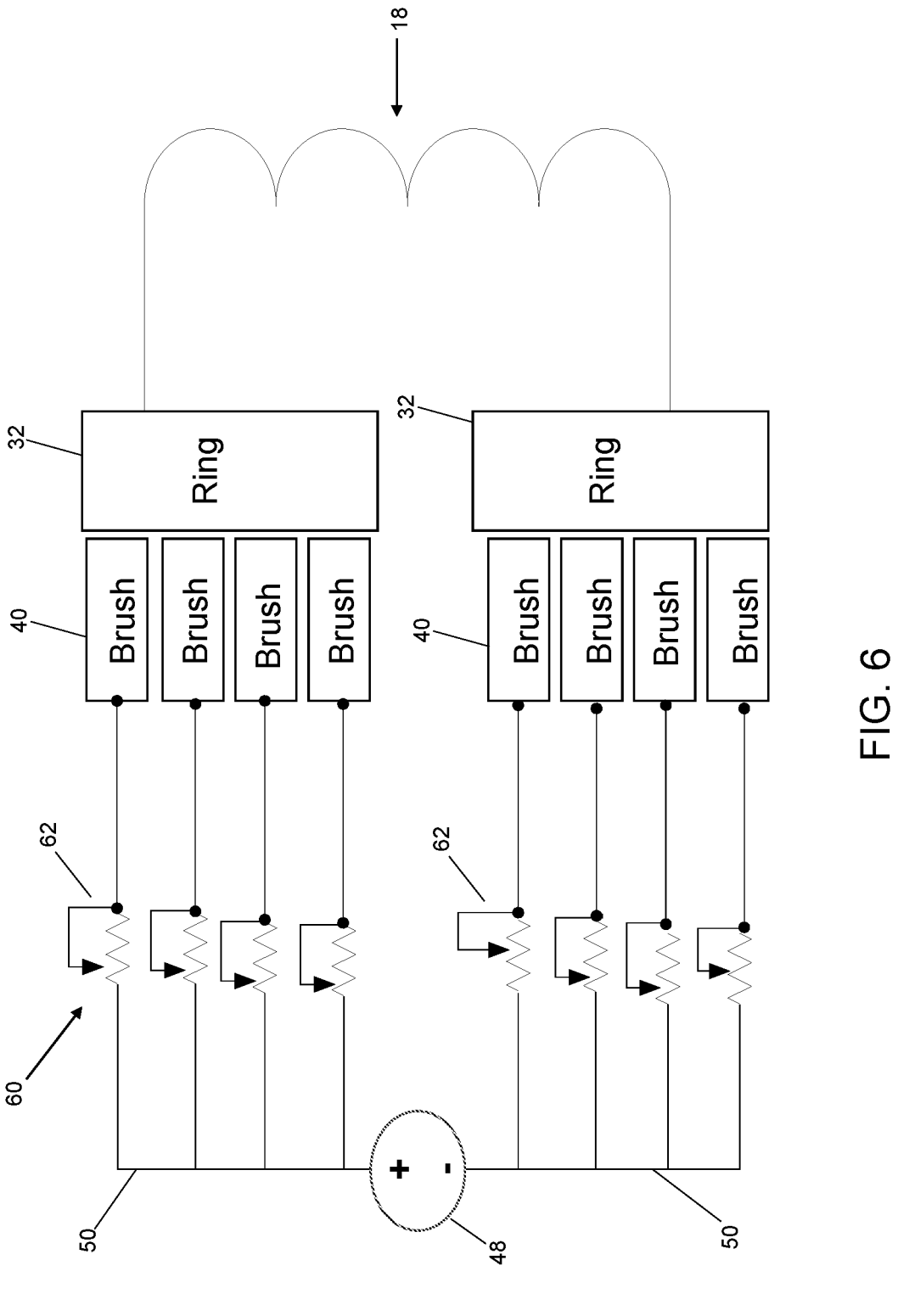
Figure 7:
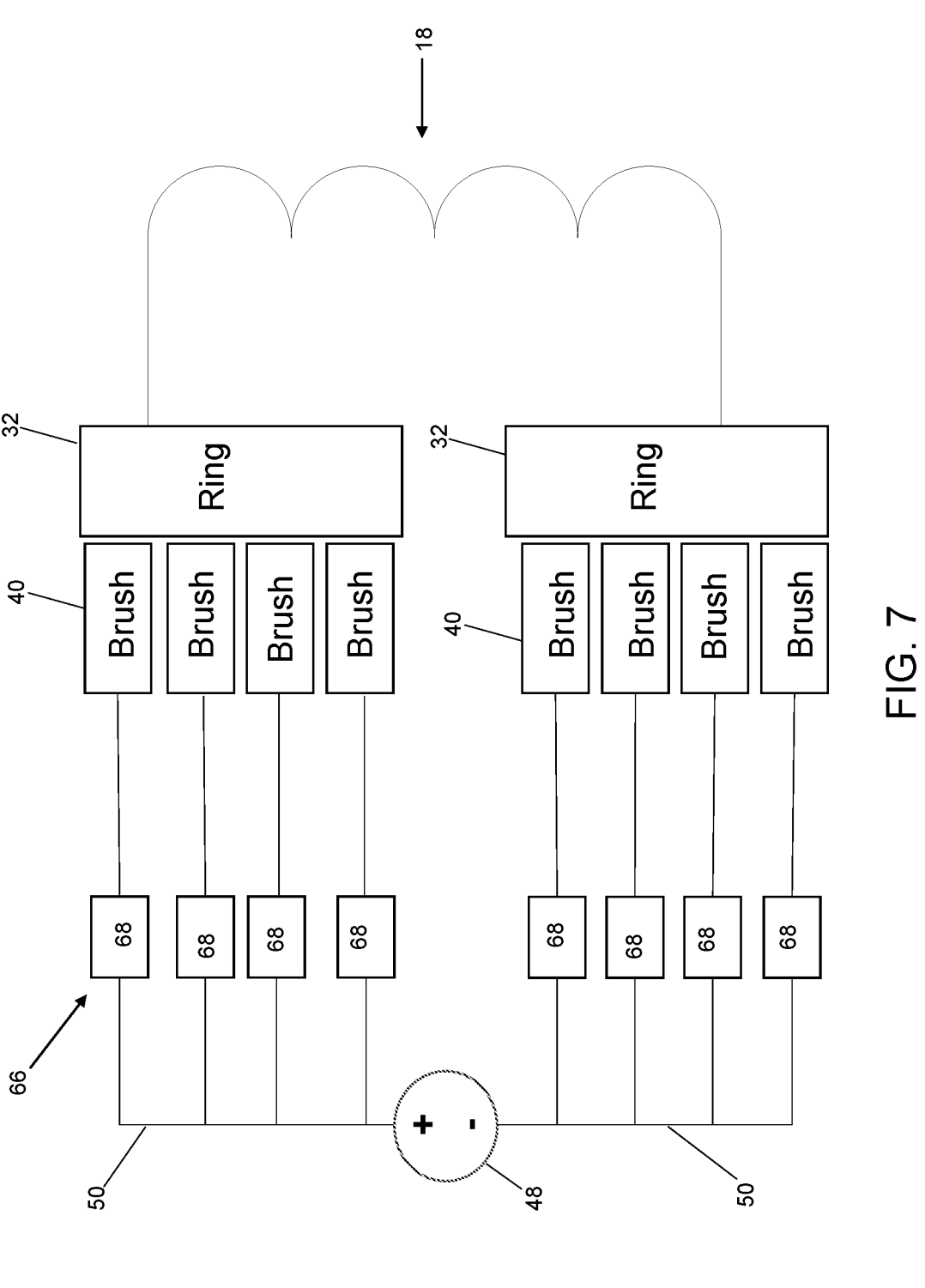
Figure 8:
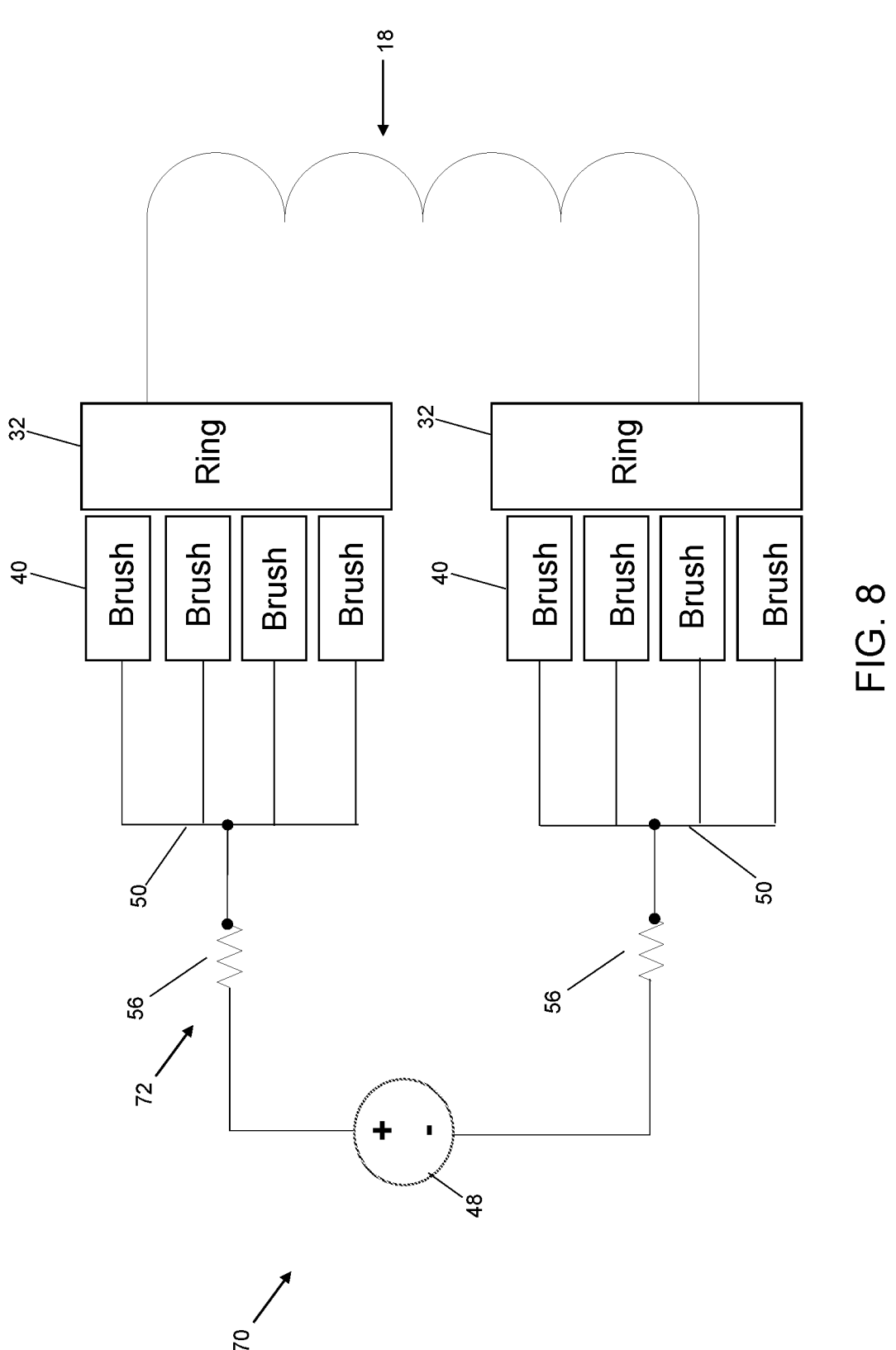
Figure 9:
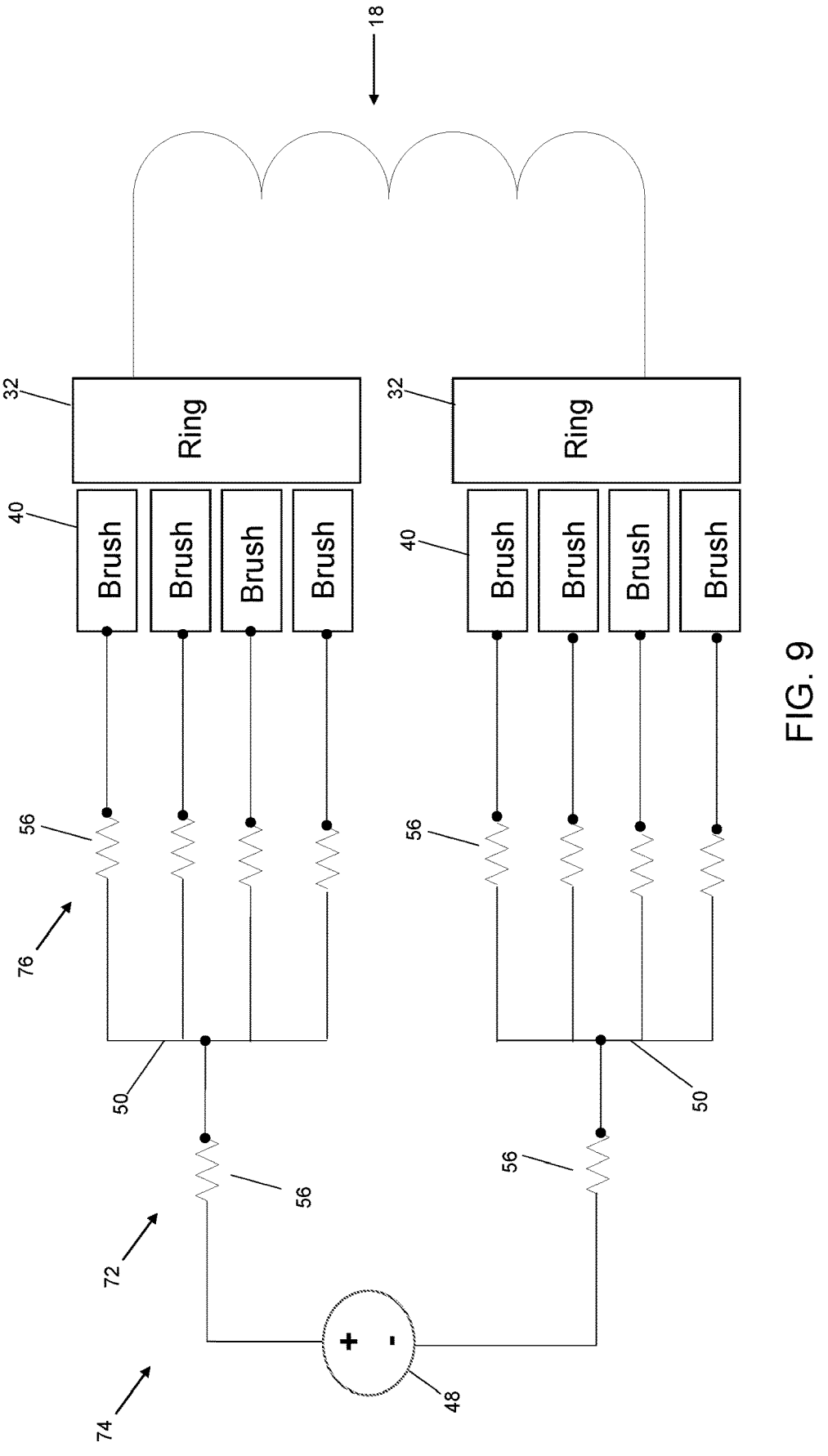
Figure 10:
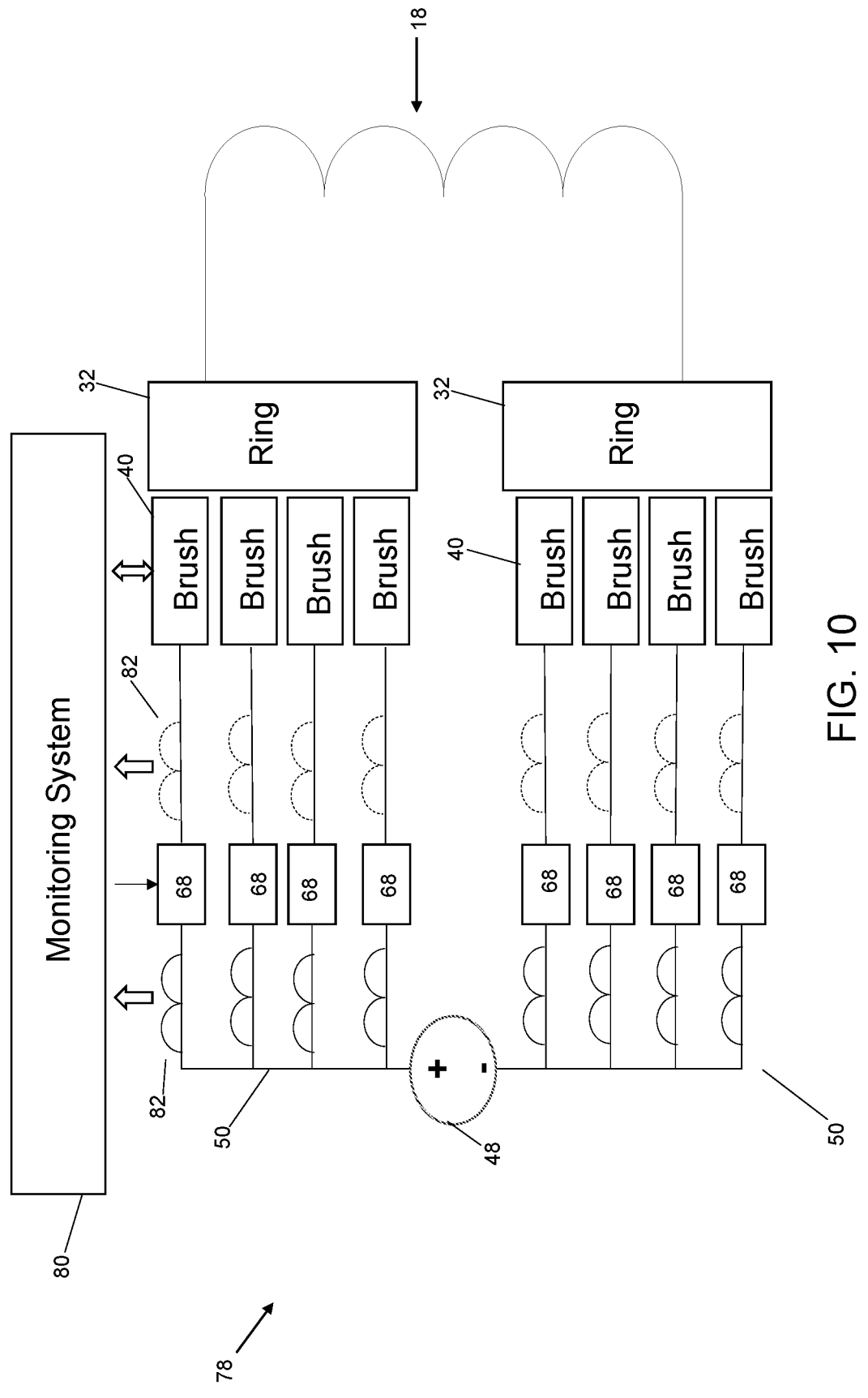
Figure 11:
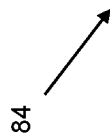
Figure 12:
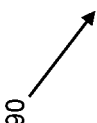

FIG. 4 shows a schematic representation of an electrical circuit illustrating the passing of electrical current between an external source and multiple field windings of coils from a rotor body of an electrical generator like that depicted in FIG. 2 via electrical brushes that are maintained continuously on a surface of collector rings of the generator like that depicted in FIG. 3 according to the prior art;

FIG. 5 shows a schematic representation of an electrical circuit illustrating the passing of electrical current between an external source and multiple field windings of coils from an electrical generator with an arrangement of resistor devices in the form of fixed resistors connected between the source and the electrical brushes according to an embodiment of the invention;

FIG. 6 shows a schematic representation of an electrical circuit illustrating the passing of electrical current between an external source and multiple field windings of coils from an electrical generator with an arrangement of resistor devices in the form of variable resistors connected between the source and the electrical brushes according to an embodiment of the invention;

FIG. 7 shows a schematic representation of an electrical circuit illustrating the passing of electrical current between an external source and multiple field windings of coils from an electrical generator with an arrangement of resistor devices in the form of power electronic-based resistors connected between the source and the electrical brushes according to an embodiment of the invention;

FIG. 8 shows a schematic representation of an electrical circuit illustrating the passing of electrical current between an external source and multiple field windings of coils from an electrical generator with an arrangement of resistors where each resistor is electrically connected to a group of electrical brushes according to an embodiment of the invention;

FIG. 9 shows a schematic representation of an electrical circuit illustrating the passing of electrical current between an external source and multiple field windings of coils from an electrical generator with an arrangement of resistors where a first set of resistors are placed in legs leading to electrical brushes and a second set of resistors are placed between the external source and groupings of the electrical brushes according to an embodiment of the invention;

FIG. 10 shows a schematic representation of the electrical circuit depicted in FIG. 7 with a monitoring system to monitor the electrical brushes and the electrical current about the resistor devices according to an embodiment of the invention;

FIG. 11 shows a schematic representation of an electrical circuit illustrating the passing of electrical current between an external source and multiple field windings of coils from an electrical generator with an arrangement of switches operatively coupled with an arrangement of resistor devices in the form of fixed resistors that are placed between the source and electrical brushes according to an embodiment of the invention; and FIG. 12 shows a schematic representation of an electrical circuit illustrating the passing of electrical current between an external source and multiple field windings of coils from an electrical generator with an arrangement of switches operatively coupled with an arrangement of resistor devices in the form of variable resistors that are placed between the source and electrical brushes according to an embodiment of the invention.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to dynamoelectric machines, and more specifically, to deploying an arrangement of resistor devices in electrical connection with an external source that passes electrical current between electrical brushes that are maintained on a surface of a collector ring placed on a rotating shaft of a dynamoelectric machine. In operation, the resistor devices are configured to remove the variable resistance between the source and the brushes. To this extent, the resistor devices can control an amount of the flow of the electrical current that is distributed to individual electrical brushes and/or one or more groups of brushes while the dynamoelectric machine is operating. This ensures that each electrical brush can receive a specified current flow.

Although the various embodiments are described with respect to an electrical generator, it is understood that these embodiments have applicability with other types of dynamoelectric machines that utilize collector rings and electrical brushes that can ride on the rings during the operation of the machines. Examples of other dynamoelectric machines that the various embodiments may have applicability include, but are not limited to, electric motors and alternators.

Referring to the figures, FIG. 2 shows an isometric view of an electrical generator 10 according to the prior art. As shown in FIG. 2, the electrical generator 10 includes a rotor body 12 that can be made of a ferrous metal material that is rotatably mounted on a shaft 14 via a bearing assembly (not illustrated). Arranged circumferentially about the mid-section of the rotor body 12 are a multiple of axially oriented slots 16 extending radially outward from a center of the rotor body. The slots are used for holding a multiple of field windings of coils 18 that can be made of copper or aluminum. These multiple of field windings of coils can include longitudinally oriented central windings 20 secured within the slots 16, and turns of endwindings 22 extending out from the slots 16 at axial ends 24 of the rotor body 12.

The shaft 14 of the electrical generator 10 can include a driven end 26 having a coupling 28 for a prime mover such as a gas turbine or a steam turbine that is operative to turn the shaft. The turning of the shaft by the prime mover produces a rotating magnetic field within the machine. This induces a three-phase set of voltages with stator windings in a stator of the electrical generator 10 that encloses the rotor body 12. Both the stator and stator windings are not illustrated for purposes of clarity. The opposing end of the shaft 14, which can be referred to as the non-driven end 30, includes collector rings 32, such as for example slip rings, mounted on or attached to the shaft that rotate with shaft as the shaft rotates, and a coupling 34 which can be used to couple a generator excitation system in one embodiment or a gear reduction unit in another embodiment. Stationary electrical brushes (not illustrated in FIG. 2) that can be spring loaded are maintained continuously on a surface of the collector rings 32 as the rings rotate with the shaft 14. Electrical current from an external source such as a generator excitation system can be supplied to the collector rings 32 via the electrical brushes. The electrical current passes from the collector rings 32 passes internally through the shaft 14 to the field windings 18 in the rotor body 12. In this manner, the electrical current that passes from the electrical brushes to the collector rings 32 to the field windings 18 can maintain the rotating electromagnetic field at a fixed polarity.

FIG. 3 illustrates a partial perspective view of a single brush holder rigging assembly 36 installed on a brush mount or a collector horseshoe 38 installed on a collector ring 32 of an electrical generator like that depicted in FIG. 2 according to the prior art. Although not shown in FIG. 3, the collector ring 32 rotates along with the shaft and the rotor body of the electrical generator. For clarity, FIG. 3 only shows one brush holder rigging assembly 36, but it is understood that more rigging assemblies can be mounted on the collector horseshoe 38 and distributed at least partially around the collector ring 32. Each brush holder rigging assembly 36 can include one or more electrical brushes 40 and a corresponding brush holder 42 for the brush(es) and a stationary support member 44. For example, FIG. 3 shows that the brush holder rigging assembly 36 can include a pair of electrical brushes 40 in the brush holder 42. The electrical brushes 40 are typically a block of graphite-like carbon compound that can conduct electricity freely and has generally very low friction so that it does not wear down the collector ring 32. The brush holder 42 retains the brush(es) contained therein at least in the axial and circumferential directions. In one embodiment, the brush holder 42 can use a brush spring that radially biases the electrical brush(es) in a downward direction to maintain contact with a surface of the collector ring 32. The stationary support member 44 is configured for electrical connection to the collector horseshoe 38. To this extent, the stationary support member 44 can be fabricated of a conductive material or include a conductive material, as well as have the electrical wiring for carrying the electrical current to or from the brush(es). The brush holder rigging assembly 36 may be bolted or screwed to the collector horseshoe 38, however it is understood that other methods of fastening, attaching or the like may be utilized. Details of the brush holder rigging assembly 36 are well-known, and are disclosed for example, in the U.S. Pat. No. 10,158,206, of which the content of its disclosure is incorporated herein by reference.

It is understood that the foregoing description of the brush holder rigging assembly 36 is representative of only one configuration that can be used to maintain electrical brushes continuously on a surface of a collector ring 32 as the ring rotates with the shaft 14 while being operative to pass electrical current between the field windings 18 in the rotor body 12 of the electrical generator 10 and a generator excitation system, and is not meant to limit the scope of the various embodiments. Those skilled in the art will appreciate that the embodiments described herein can be implemented with other types of brush holder rigging assemblies.

FIG. 4 shows a schematic representation of an electrical circuit 46 illustrating the passing of electrical current between an external source 48 such as a generator excitation system and multiple field windings of coils 18 from the rotor body 12 of the electrical generator 10 depicted in FIG. 2 via electrical brushes 40 that are maintained continuously on a surface of a collector ring 32 of the generator like that depicted in FIG. 3 according to the prior art. As shown in FIG. 4, the external source 48, which can be a power source, such as for example, a direct current (DC) source, can supply DC power to the brushes via electrical wiring 50 in the form of electrical current. The electrical brushes 40 pass the electrical current to the collector rings 32 which supply the current to the field windings of coils 18. As shown in this figure, one ring 32 with electrical brushes 40 operatively coupled to the ring, is connected to the positive terminal of the external source 48, while the other ring 32 with brushes 40 is connected to the negative terminal of the source 48. With this configuration, not only can electrical current pass from the electrical brushes 40 and the collector rings 32 to the field windings of coils 18, but the electrical current can also pass from the field windings of coils 18 to the external source 48 via the collector rings 32 and the electrical brushes 40.

The schematic of FIG. 4, as well as the schematics of the other figures disclosed herein, only shows four electrical brushes 40 per collector ring 32 that are configured to supply the rings with electrical current via corresponding parallel paths. However, it is understood that there could be substantially more brushes that are operatively coupled to the collector rings. For example, there could be 10 to 100 parallel paths of electrical brushes per collector ring 32.

Figure 1:
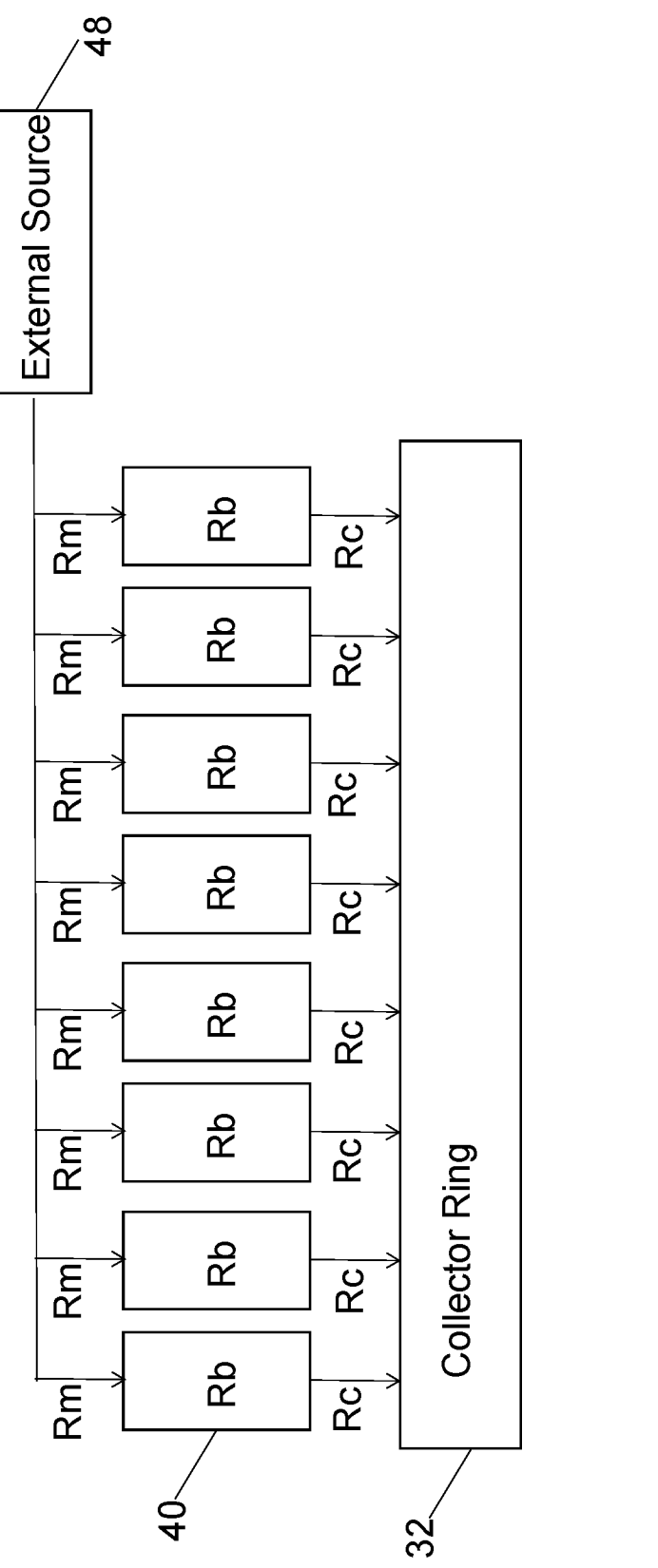
FIG. 1 shows a schematic that illustrates the overall resistance that exists between an external source that supplies electrical current to a collector ring via a plurality of electrical brushes according to the prior art.

As discussed above with respect to FIG. 1, each of the individual brush paths or legs in the electrical circuit 46 from the external source 48 through the electrical brushes 40 to the contact surfaces between the brushes and the collector rings 32 will have an inherent resistance that can affect the distribution of the electrical current from the source to the brushes. For example, each leg will have a contact resistance Rc between the electrical brush 40 and the collector ring 32, a resistance of the electrical brush Rb itself, and miscellaneous resistances Rm that arise from electrical connections and unintended electrical paths, all of which collectively contribute to the overall resistance in each of the legs. If there is a high level of resistance in a leg, then the electrical brush 40 in that leg will receive a low amount of the electrical current from the external source 48 in comparison to a brush in a leg that has a lower level of resistance. Similarly, if there is a low level of resistance in a leg, then the electrical brush 40 in that leg will receive a high amount of the electrical current from the external source 48 in comparison to a brush in a leg that has a higher level of resistance. This imbalance in the electrical current that is received by the electrical brushes 40 that arises because of the inherent resistance in each of the legs can lead to some of the electrical brushes having almost zero current, while other brushes can receive two to three times the average current value that the brushes are optimized to handle. This uneven distribution of the electrical current between the electrical brushes, or selectivity, can lead to brushes overheating because they are receiving too much current. Further, this uneven distribution of the electrical current between the electrical brushes can cause poor film development between the brushes and the collector rings which is integral to maintaining brush life and countering the considerable variability of the contact resistance Rc. These effects of selectivity in the electrical brushes 40 that can occur in the configuration depicted in FIG. 4 are sources for flashovers that can create safety and operations risks (e.g., significant arc damage, melting of parts, putting nearby operators in danger).

The various embodiments described herein address the variability in the inherent resistance that arises in the brush paths or legs from the external source 48 through the electrical brushes 40 to the contact surfaces between the brushes and the collector rings 32 by deploying an arrangement of resistor devices, such as for example, balance resistor devices that can control the resistance in each of the legs to balance out the distribution of the electrical current. In this manner, the arrangement of resistors enables the various embodiments to drive more equal sharing of the electrical current among the electrical brushes 40. As a result, the arrangement of resistor devices allow the various embodiments to control the amount of the electrical current that is distributed to individual brushes and/or one or more groups of brushes such that the brushes can receive a specified amount of the current.

These arrangements of resistor devices can be implemented in any of a number of different locations. These locations include, but are not limited to, the brush holders and the brush holder rigging assemblies (e.g., in the stationary support members or other components within the brush holder rigging assemblies including the electrical wiring in the rigging assemblies, including wiring pigtails).

FIG. 5 shows a schematic representation of an electrical circuit 52 illustrating the passing of electrical current between the external source 48 and the multiple field windings of coils 18 with an arrangement 54 of resistor devices 56 connected between the source and the electrical brushes according to an embodiment of the invention. As shown in FIG. 5, the resistor devices 56 can include fixed resistors. In one embodiment, the fixed resistors are selected to have a resistance that is larger than the contact resistance Rc between the electrical brush 40 and the collector ring 32. Having the resistance of the fixed resistors in each of the legs larger than the contact resistance Rc allows the leg resistance in the legs to be controlled to resistance values that will overcome the variability in the inherent resistance of each of the legs. To this extent, the resistor devices 56 can drive more equal sharing of the supply of the electrical current from the external source 48. In particular, having the resistance of the fixed resistors in each of the legs larger than the contact resistance Rc drives more equal sharing of the electrical current among the electrical brushes 40. As used herein, more equal sharing of the current means the electrical brushes share approximately the same current (e.g., all values within 10%) versus unequal sharing (e.g., where some brushes carry no currents while others carry currents up to twice the average or higher). It is understood that there will still be some variation in the leg resistance in the legs, but having the resistance of the fixed resistors larger the contact resistance Rc is sufficient to drive more sharing of the electrical current between the electrical brushes 40.

The selection of the resistance of the fixed resistors is understood to be within the realm of those skilled in the art, and will depend on factors that can include, but not limited to, the contact resistance Rc, the electrical brush resistance Rb, and the miscellaneous resistances Rm in the legs, as well as the electrical current supplied by the external source 48. In one embodiment, the resistance of the fixed resistors in each of the legs can all have the same resistance value. As long as this same resistance value for the fixed resistors is sized large enough so that any variation in resistance from other sources in the legs (e.g., Rc, Rb, and Rm) is a small percentage, then the variation in resistance can be overcome so that there will be more equal sharing of the current.

Because the use of the fixed resistors with the same resistance values necessitate the use of a value that is sized large enough to overcome the variation in resistance from other sources in the legs, there is a possibility that there will be losses that are introduced to the collector 32 in the electrical circuit 52 of FIG. 5. In order to obviate the introduction of the collector other types of balance resistor device configurations can be utilized. For example, instead of using fixed resistors, variable resistor devices can be deployed.

FIG. 6 shows a schematic representation of an electrical circuit 58 illustrating the passing of electrical current between an external source 48 and multiple field windings of coils 18 with an arrangement 60 of resistor devices 62 in the form of variable resistors connected between the source and the electrical brushes 40. With the use of the variable resistors, the resistance values of the resistor devices 62 in FIG. 6 can be adjusted as needed to ensure that there is more equal sharing of the electrical current among the electrical brushes 40. In one embodiment, the variable resistors can be adjusted to obtain substantially equal resistance values in each of the legs. As used herein, "substantially equal resistance" means resistance values that are within 10% of each other. By having the capability to adjust the variable resistors to obtain substantially equal resistance, the electrical circuit 58 of FIG. 6 can drive more consistent electrical current to each individual electrical brush 40.

In one embodiment, the variable resistors in the electrical circuit 58 of FIG. 6 can be adjusted to have differing resistance values in order to drive a specified amount of the flow of the electrical current from the external source 48 to each of the electrical brushes 40. It is noted that the widths of the pointers used to depict the variable resistors are associated with resistance values of the resistors. In general, a variable resistor depicted in FIG. 6 with a pointer that covers a larger width of the resistor is representative of a low resistance value, while a smaller width of the resistor is representative of a high resistance value. For example, a variable resistor with a pointer that covers substantially the whole width of the resistor is indicative of zero resistance.

It is understood that other types of devices can be utilized besides the variable resistors depicted in FIG. 6 to adjust the resistance in each of the legs so that there is more equal sharing of the electrical current among the electrical brushes 40. For example, power electronic-based resistor devices can be connected between the external source 48 and the electrical brushes 40 and used to adjust the resistance in each of the legs to drive the electrical current in the legs that goes to a respective brush to have a specified amount of current. In one embodiment, the power electronic-based resistor devices can drive the electrical current to be shared such that the current in each of the brushes is substantially equal. In another embodiment, the power electronic-based resistor devices can drive a specified amount of electrical current to each of the electrical brushes 40. As used herein, "power electronic-based resistor devices" means a power electronic device that can act as a solid-state switch that specifies a resistance value in a brush path leg. An illustrative, but non-exhaustive listing of power electronic-based resistor devices include power diodes, metal-oxide-semiconductor-field-effect transistors (MOSFETs), bipolar junction transistors (BJTs), insulated-gate bipolar transistors (IGBTs) and thyristors (e.g., silicon-controlled rectifier (SCR), gate turn-off (GTO) thyristors, and MOS-controlled thyristors).

FIG. 7 shows a schematic representation of an electrical circuit 64 illustrating the passing of electrical current between an external source 48 and multiple field windings of coils 18 with an arrangement 66 of resistor devices in the form of power electronic-based resistors 68 connected between the source and the electrical brushes 40. Like the variable resistors depicted in FIG. 6, the power electronic-based resistors 68 have the capability to fine tune the resistance in each leg to drive equal sharing of the electrical current among the brushes and/or drive a specified amount of electrical current to each of the electrical brushes 40. The arrangement 66 of the power electronic-based resistors 68 have the advantage of reducing losses like the variable resistors, but would occupy less space in an implementation as they are smaller in size.

Although the embodiments described with respect to FIGS. 5-7 are directed to an arrangement of resistor devices with a resistor device in each of the legs connected in series with the external source 48 and the electrical brushes 40, it is understood that other arrangements of the resistor devices with respect to the source, legs and brushes are possible. For example, FIG. 8 shows a schematic representation of an electrical circuit 70 illustrating the passing of electrical current between the external source 48 and the multiple field windings of coils 18 with an arrangement 72 of resistors 56 where each resistor is electrically connected to a group of electrical brushes 40. As shown in FIG. 8, the resistors 56 can be fixed resistors. In this embodiment, each of the fixed resistors 56 in the arrangement 72 are coupled to a group of electrical brushes 40. In particular, each of the fixed resistors 56 for a particular group of electrical brushes 40 is connected in series with the external source 48 and parallel paths of legs that lead to corresponding electrical brushes in the group. With this configuration, assuming that the resistance values of the fixed resistors 56 are greater than the values of the contact resistances Rc for each of the electrical brushes 40 in a respective group of brushes, the fixed resistors 56 can control the flow of the electrical current from the external source 48 that goes to the brushes in each of the groups. To this extent, the fixed resistors 56 can drive the electrical current from the external source 48 in a manner that advances equal sharing of the current among each of the groups of electrical brushes 40.

In order to provide more control of the electrical current that is supplied to each of the electrical brushes 40 in the groups of brushes. A further arrangement of fixed resistors 56 can be disposed in each of the legs connecting with the electrical brushes 40 for the groups of electrical brushes. For example, FIG. 9 shows a schematic representation of an electrical circuit 74 illustrating the passing of electrical current between the external source 48 and the multiple field windings of coils 18 from an electrical generator with an additional arrangement 76 of fixed resistors 56 placed in each leg of the electrical brushes 40 in a particular group of brushes. In essence, the embodiment depicted in FIG. 9 is a stepped approach whereby the arrangement 72 of resistors drives the electrical current from the external source 48 to be shared among the various groupings of electrical brushes 40, while the additional arrangement 76 of fixed resistors 56 are used to control the distribution of the current that is shared by the groups of electrical brushes 40 to manage how much of that shared current goes to each brush in the groups. In this manner, the arrangement 72 of resistors provides a primary form of control to drive equal sharing of the electrical current that goes to each of the groups, while the additional arrangement 76 of fixed resistors 56 provides a secondary form of finer control that drives equal sharing of the electrical current that is received by the groups among each of the electrical brushes 40 in the groups.

Both FIGS. 8 and 9 show that the arrangement 72 of fixed resistors 56 connected with groups of electrical brushes 40 that include four brushes, however, this configuration is only representative of one approach and is not meant to be limiting. For example, the arrangement 72 of fixed resistors 56 can be connected with groups of electrical brushes 40 that include more or less than four brushes. Also, instead of connecting the arrangement 72 of fixed resistors 56 to groups of electrical brushes 40, it is possible to have these resistors connected to pairs of electrical brushes.

Additionally, it is noted that both FIGS. 8 and 9 show that the arrangement of resistor devices used in these embodiments are fixed resistors, however, those skilled in the art will appreciate that other types of resistor devices can be deployed. For example, the fixed resistors 56 in FIGS. 8 and 9 can be replaced with any of the other types of resistors mentioned above such as for example, but not including variable resistors and power electronic-based resistors.

Although the embodiments described with respect to FIGS. 5-9 are directed to arrangements of resistor devices where all the resistors devices in each of these embodiments include the same type of resistor device, it is understood that other arrangements of resistor devices can include a combination of any of the aforementioned resistor device. That is, the embodiments can have an arrangement of different resistor devices where the resistor devices are selected from the group consisting of fixed resistors, variable resistors, power electronic-based resistors, and combinations thereof.

Further, as noted above, there could be 10 to 100 parallel paths of electrical brushes per collector ring. Accordingly, it should be understood that the depiction of the lesser amount of paths depicted in FIGS. 5-9 does not represent all of the various resistor devices that can be deployed in a typical configuration. Further, the representation of the resistor devices and the various levels of pairings of resistors devices to connect with individual brushes or groups of brushes are representative of only a few possible options and are not mean to be limiting to the various embodiments.

In another embodiment, the use of the arrangements of the various resistor devices to control the sharing of the electrical current among electrical brushes can be used as part of a collector brush monitoring system. For example, collector brush monitoring systems that have the capability to monitor the wear and temperature of the brushes, as well as the amount of current supplied to the brushes, can be configured to monitor the current that is about the various resistor device so that the resistance of the resistor devices can be adjusted in manner that drives sharing of the electrical current among the brushes and/or facilitates a specified amount of current that is to be supplied to individual brushes.

FIG. 10 shows a schematic representation of an electrical circuit 78 with a monitoring system 80 to monitor the electrical current about each of the various resistor devices in the circuit based on current measurements obtained from current sensing devices 82. In this embodiment, the current sensing devices 82 measure the current that is about each of the resistor devices which in one embodiment can include power electronic-based resistors 68. The current sensing devices 82, which can include, but are not limited to, current transformers and current sensors, are preferably located between the external source 48 and the power electronic-based resistors 68. In an alternative embodiment, the current sensing devices 82 can be located between the power electronic-based resistors 68 and electrical brushes 40. In another embodiment, current sensing devices 82 can be located both between the external source 48 and the resistor devices, as well as between the resistors and the electrical brushes.

With any of these implementations, the current sensing devices 82 can provide the electrical measurements about the power electronic-based resistors 68 to the monitoring system 80. The monitoring system 80, which can include a control unit, can monitor the electrical current measurements and automatically adjust the resistance of the power electronic-based resistors 68 based on the measurements to drive sharing of the current among the electrical brushes 40 and/or facilitate that specified amounts of current are delivered to each of brushes. To this extent, the control unit of the monitoring system 80 can fine tune the resistance with each of the power electronic-based resistors 68 in the various legs to get a specific brush current at the brushes.

Although the embodiment depicted in FIG. 10 is described with respect to the use of power electronic-based resistors, it understood that other types of adjustable resistor device can be deployed with a monitoring system for facilitating adjustment of the resistance of resistor devices. For example, variable adjustable resistors can be used instead of power electronic-based resistors in a comparable monitoring system.

Further, it is understood that the monitoring system 80 can perform additional functions beyond monitoring current measurements from the current sensing devices 82 and adjusting the resistances of the adjustable resistor devices to drive and regulate the electrical current that is received by the electrical brushes 40. For example, the control unit of the monitoring system 80 can perform functions that include, but are not limited to, controlling the supply of the electrical current from the external source 48, setting and monitoring protection limits for excessive current measurements with trips, alerts, and the like, and monitoring the electrical brushes 40 for wear.

The various embodiments depicted in FIGS. 5-10 are all described with respect to the use of at least one arrangement of resistor devices to drive equal sharing of the electrical current among electrical brushes 40 and/or driving a specified amount of current to individual brushes or groups of brushes, however, other electrical components can be utilized to control the current that is supplied from the external source 48 to the brushes. For example, an arrangement of switches can be electrically connected to between the external source 48 and the resistor devices. In one embodiment, the arrangement of switches can be used ensure an optimal average current density is supplied to the electrical brushes 48. In one scenario, the switches can be turned on and off to activate or deactivate one or more of a single electrical brush, a pair of brushes, and a group of brushes for a predetermined time period in order to adjust the average current density of the current passing through the active brushes to be within a predetermined current density range. In this manner, the turning on and off of the switches to activate or deactivate selective brushes ensure that all of the brushes that are active will operate per their optimal average current density. This can keep the electrical brushes 40 from becoming too hot, and thus preventing the brushes from getting more current and even hotter to the point that the increased current flow and heating causes the brushes to wear at an accelerated rate.

With the optimal average current density being provided to the electrical brushes, the arrangement of the resistors described herein can complement this aspect by providing further control of the amount of the electrical current that is received at each of the electrical brushes 40. In particular, the arrangement of the resistors can ensure that a specified amount of electrical current is provided to the electrical brushes after the switches have been utilized to ensure that an optimal average current density is to be supplied to the brushes. That is, the arrangement of resistor devices can drive equal sharing of the electrical current among electrical brushes and/or drive a specified amount of current to individual brushes or groups of brushes.

FIG. 11 shows a schematic representation of an electrical circuit 84 with an arrangement 54 of fixed resistor 56 operatively coupled with an arrangement 86 of switches 88 and the electrical brushes 40 according to an embodiment of the invention. In one embodiment, the switches 88 are configured to be turned on and off to activate or deactivate selective brushes to ensure that all of the brushes that are active operate per their optimal average current density. As discussed above, the arrangement 54 of resistors 56 are configured to remove the variable resistance between the external source 48 and the electrical brushes 40. In this manner, the arrangement 54 of the resistors 56 can ensure that a specified amount of electrical current is provided to the electrical brushes 40. That is, the arrangement 54 of resistor devices 56 can drive equal sharing of the electrical current among the electrical brushes and/or drive a specified amount of current to individual brushes or groups of brushes Instead of using fixed resistors as depicted in FIG. 11, an arrangement of variable resistors can be used in placed thereof. For example, FIG. 12 shows a schematic representation of an electrical circuit 90 with an arrangement 60 of variable resistor devices 62 operatively coupled with an arrangement 86 of switches 86 and the electrical brushes 40. The arrangement of switches and resistors depicted in FIG.

12 can operate in a manner similar to the embodiment described with respect to FIG. 11.

Further details of using an arrangement of switches to control the supply of current from the external source 48 to the electrical brushes 40 is provided in U.S. patent application Ser. No. 18/493,906, entitled "SYSTEM AND METHOD FOR SELECTIVE ACTIVATION AND DEACTIVATION OF ELECTRICAL BRUSHES USED IN DYNAMOELECTRIC MACHINE FOR CURRENT DENSITY OPTIMIZATION", of which the content of its disclosure is incorporated herein by reference.

From the description of the illustrated embodiments presented herein, it should be evident that the subject disclosure sets forth an effective solution for driving the even distribution of electrical current to electrical brushes that are operatively coupled to collector rings placed on a dynamoelectric machine such as an electrical generator, thereby improving performance of the machine. By driving the even distribution of electrical current to the electrical brushes, the various embodiments are able to eliminate or minimize selectivity concerns which can lead to brushes overheating, having poor film development between the brushes and the collector rings (which is integral to maintaining brush life and minimizing variability of the contact resistance Rc). With selectivity concerns obviated, flashovers that can create safety and operations risks (e.g., significant arc damage, melting of parts, putting nearby operators in danger) can be avoided.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc., if used, are merely labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Moreover, articles "a" and "an" as used in the subject specification and annexed drawings should generally be construed to mean "one or more" unless specified otherwise or clear from context to be directed to a singular form. In addition, the phrase "one or more of" used before a listing of a number of possible options or recitations is intended to mean any of the natural inclusive permutations. For example, "one or more of A and B" is satisfied by only A, only B, or both A and B.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system, comprising: a collector ring placed on a rotating shaft of a dynamoelectric machine; a plurality of electrical brushes maintained on a surface of the collector ring as the collector ring rotates with the rotating shaft, wherein the plurality of electrical brushes are configured to pass electrical current between an external source and the dynamoelectric machine via the collector ring; and an arrangement of a plurality of resistor devices electrically connected to the plurality of electrical brushes to control a distribution of a flow of the electrical current between the external source and the plurality of electrical brushes, wherein the arrangement of the plurality of resistor devices is configured to control an amount of the flow of the electrical current that is distributed to individual brushes and/or one or more groups of brushes from the plurality of electrical brushes while the dynamoelectric machine is operating.

The system of the preceding clause, wherein the arrangement of the plurality of resistor devices is configured to drive equal sharing of the flow of the electrical current among each of the plurality of electrical brushes.

The system of any of the preceding clauses, wherein each of the plurality of resistor devices is electrically connected to a different one of the plurality of electrical brushes.

The system of any of the preceding clauses, wherein some of the plurality of resistor devices are electrically connected to a group of different electrical brushes.

The system of any of the preceding clauses, wherein others of the plurality of resistor devices are disposed in each group of different electrical brushes in a brush path leg leading to one of the electrical brushes in the group.

The system of any of the preceding clauses, wherein the plurality of resistor devices is selected from the group consisting of fixed resistors, variable resistors, power electronic-based resistors, and combinations thereof.

The system of any of the preceding clauses, further comprising a monitoring system having a control unit operatively coupled to the plurality of resistor devices to control the resistance of the resistor devices.

The system of any of the preceding clauses, further comprising a plurality of current sensing devices to measure the amount of electrical current distributed to the plurality of electrical brushes, wherein each of the plurality of current sensing devices is located about one of the plurality of resistor devices to measure the amount of electrical current thereabout.

The system of any of the preceding clauses, wherein the control unit of the monitoring system is configured to receive electrical current measurements from each of the plurality of current sensing devices and adjust the resistance of each of the plurality of resistor devices as a function of the amount of electrical current measured by a corresponding current sensing device.

The system of any of the preceding clauses, further comprising an arrangement of a plurality of switches electrically connected to the external source and the arrangement of the plurality of resistor devices, wherein the plurality of switches are configured to selectively activate and deactivate the plurality of electrical brushes while the dynamoelectric machine is operating to control the average current density of the flow of the electrical current that is provided to the electrical brushes.

The system of any of the preceding clauses, wherein selective ones of the plurality of switches are opened and closed for a predetermined time period to adjust the average current density of the electrical current that passes through the electrical brushes to be within a predetermined current density range, and wherein the plurality of resistor devices are configured to control the amount of the electrical current received at each of the electrical brushes to a specified electrical current amount.

A dynamoelectric machine, comprising: a rotatable shaft; a rotor body mounted on the rotatable shaft, the rotor body having a plurality of field windings of coils secured thereabout; at least one collector ring placed on an end of the rotatable shaft; a plurality of electrical brushes maintained on a surface of the at least one collector ring as the at least one collector ring rotates with the rotatable shaft, wherein the plurality of electrical brushes are configured to pass electrical current between an external source and the field windings of coils secured to the rotor body via the at least one collector ring; and an arrangement of a plurality of resistor devices electrically connected to the plurality of electrical brushes to control a distribution of a flow of the electrical current between the external source and the plurality of electrical brushes, wherein the arrangement of the plurality of resistor devices is configured to control an amount of the flow of the electrical current that is distributed to individual brushes and/or one or more groups of brushes from the plurality of electrical brushes while the dynamoelectric machine is operating.

The dynamoelectric machine of the preceding clause, wherein the arrangement of the plurality of resistor devices is configured to drive equal sharing of the flow of the electrical current among each of the individual brushes and/or the one or more groups of brushes from the plurality of electrical brushes.

The dynamoelectric machine of any of the preceding clauses, wherein each of the plurality of resistor devices is electrically connected to a different one of the plurality of electrical brushes.

The dynamoelectric machine of any of the preceding clauses, wherein some of the plurality of resistor devices are electrically connected to a group of different electrical brushes.

The dynamoelectric machine of any of the preceding clauses, wherein the plurality of resistor devices is selected from the group consisting of fixed resistors, variable resistors, power electronic resistors, and combinations thereof.

The dynamoelectric machine of any of the preceding clauses, further comprising: a plurality of current sensing devices to measure the amount of electrical current distributed to the plurality of electrical brushes; and a monitoring system having a control unit to control the resistance of the resistor devices as a function of the amount of electrical current measured by the plurality of current sensing devices.

The dynamoelectric machine of any of the preceding clauses, further comprising an arrangement of a plurality of switches electrically connected to the external source and the arrangement of the plurality of resistor devices, wherein the plurality of switches are configured to selectively activate and deactivate the plurality of electrical brushes during the rotation of the rotor body to control the flow of the electrical current that is provided to the electrical brushes.

The dynamoelectric machine of any of the preceding clauses, wherein selective ones of the plurality of switches are opened and closed for a predetermined time period to adjust an average current density of the electrical current passing through the electrical brushes to be within a predetermined current density range while the rotor body is rotating, and wherein the plurality of resistor devices are configured to control the amount of the electrical current received at each of the electrical brushes to a specified electrical current amount.

A method for controlling current distribution to a plurality of electrical brushes maintained on a surface of a collector ring placed on a rotating shaft of a dynamoelectric machine that pass electrical current between an external source and the dynamoelectric machine, the method comprising: arranging a plurality of resistor devices in electrical connection with the plurality of electrical brushes and the external source; and controlling a distribution of a flow of the electrical current between the external source and the plurality of electrical brushes with the plurality of resistor devices, wherein the plurality of resistor devices are configured to control a specified amount of the flow of the electrical current that is distributed to individual brushes and/or one or more groups of brushes from the plurality of electrical brushes while the dynamoelectric machine is operating.

What is claimed is:

1. A system, comprising:
a collector ring placed on a rotating shaft of a dynamoelectric machine;
a plurality of electrical brushes maintained on a surface of the collector ring as the collector ring rotates with the rotating shaft, wherein the plurality of electrical brushes are configured to pass electrical current between an external source and the dynamoelectric machine via the collector ring;
an arrangement of a plurality of resistor devices electrically connected to the plurality of electrical brushes to control a distribution of a flow of the electrical current between the external source and the plurality of electrical brushes, wherein the arrangement of the plurality of resistor devices is configured to control an amount of the flow of the electrical current that is distributed to individual brushes and/or one or more groups of brushes from the plurality of electrical brushes while the dynamoelectric machine is operating; and
a monitoring system having a control unit operatively coupled to the plurality of resistor devices to control the resistance of the resistor devices.

2. The system according to claim 1, wherein the arrangement of the plurality of resistor devices is configured to drive equal sharing of the flow of the electrical current among each of the plurality of electrical brushes.

3. The system according to claim 1, wherein each of the plurality of resistor devices is electrically connected to a different one of the plurality of electrical brushes.

4. The system according to claim 1, wherein some of the plurality of resistor devices are electrically connected to a group of different electrical brushes.

5. The system according to claim 4, wherein others of the plurality of resistor devices are disposed in each group of different electrical brushes in a brush path leg leading to one of the electrical brushes in the group.

6. The system according to claim 1, wherein the plurality of resistor devices is selected from the group consisting of fixed resistors, variable resistors, power electronic-based resistors, and combinations thereof.

7. The system according to claim 1, further comprising a plurality of current sensing devices to measure the amount of electrical current distributed to the plurality of electrical brushes, wherein each of the plurality of current sensing devices is located about one of the plurality of resistor devices to measure the amount of electrical current thereabout.

8. The system according to claim 7, wherein the control unit of the monitoring system is configured to receive electrical current measurements from each of the plurality of current sensing devices and adjust the resistance of each of the plurality of resistor devices as a function of the amount of electrical current measured by a corresponding current sensing device.

9. The system according to claim 1, further comprising an arrangement of a plurality of switches electrically connected to the external source and the arrangement of the plurality of resistor devices, wherein the plurality of switches are configured to selectively activate and deactivate the plurality of electrical brushes while the dynamoelectric machine is operating to control the average current density of the flow of the electrical current that is provided to the electrical brushes.

10. The system according to claim 9, wherein selective ones of the plurality of switches are opened and closed for a predetermined time period to adjust the average current density of the electrical current that passes through the electrical brushes to be within a predetermined current density range, and wherein the plurality of resistor devices are configured to control the amount of the electrical current received at each of the electrical brushes to a specified electrical current amount.

11. A dynamoelectric machine, comprising:

a rotatable shaft;

a rotor body mounted on the rotatable shaft, the rotor body having a plurality of field windings of coils secured thereabout;

at least one collector ring placed on an end of the rotatable shaft;

a plurality of electrical brushes maintained on a surface of the at least one collector ring as the at least one collector ring rotates with the rotatable shaft, wherein the plurality of electrical brushes are configured to pass electrical current between an external source and the field windings of coils secured to the rotor body via the at least one collector ring;

an arrangement of a plurality of resistor devices electrically connected to the plurality of electrical brushes to control a distribution of a flow of the electrical current between the external source and the plurality of electrical brushes, wherein the arrangement of the plurality of resistor devices is configured to control an amount of the flow of the electrical current that is distributed to individual brushes and/or one or more groups of brushes from the plurality of electrical brushes while the dynamoelectric machine is operating; and a monitoring system having a control unit operatively coupled to the plurality of resistor devices to control the resistance of the resistor devices.

12. The dynamoelectric machine according to claim 11, wherein the arrangement of the plurality of resistor devices is configured to drive equal sharing of the flow of the electrical current among each of the individual brushes and/or the one or more groups of brushes from the plurality of electrical brushes.

13. The dynamoelectric machine according to claim 11, wherein each of the plurality of resistor devices is electrically connected to a different one of the plurality of electrical brushes.

14. The dynamoelectric machine according to claim 11, wherein some of the plurality of resistor devices are electrically connected to a group of different electrical brushes.

15. The dynamoelectric machine according to claim 11, wherein the plurality of resistor devices is selected from the group consisting of fixed resistors, variable resistors, power electronic resistors, and combinations thereof.

16. The dynamoelectric machine according to claim 11, further comprising:

a plurality of current sensing devices to measure the amount of electrical current distributed to the plurality of electrical brushes;

wherein the monitoring system is configured to control the resistance of the resistor devices as a function of the amount of electrical current measured by the plurality of current sensing devices.

17. The dynamoelectric machine according to claim 11, further comprising an arrangement of a plurality of switches electrically connected to the external source and the arrangement of the plurality of resistor devices, wherein the plurality of switches are configured to selectively activate and deactivate the plurality of electrical brushes during the rotation of the rotor body to control the flow of the electrical current that is provided to the electrical brushes.

18. The dynamoelectric machine according to claim 17, wherein selective ones of the plurality of switches are opened and closed for a predetermined time period to adjust an average current density of the electrical current passing through the electrical brushes to be within a predetermined current density range while the rotor body is rotating, and wherein the plurality of resistor devices are configured to control the amount of the electrical current received at each of the electrical brushes to a specified electrical current amount.

19. A method for controlling current distribution to a plurality of electrical brushes maintained on a surface of a collector ring placed on a rotating shaft of a dynamoelectric machine that pass electrical current between an external source and the dynamoelectric machine, the method comprising:

arranging a plurality of resistor devices in electrical connection with the plurality of electrical brushes and the external source;

controlling a distribution of a flow of the electrical current between the external source and the plurality of electrical brushes with the plurality of resistor devices, wherein the plurality of resistor devices are configured to control a specified amount of the flow of the electrical current that is distributed to individual brushes and/or one or more groups of brushes from the plurality of electrical brushes while the dynamoelectric machine is operating; and controlling the resistance of the resistor devices with a monitoring system having a control unit operatively coupled to the plurality of resistor devices.

* * * * *